US012686315B2

(12) United States Patent
Back et al.

(10) Patent No.: US 12,686,315 B2
(45) Date of Patent: Jul. 21, 2026

(54) SYSTEMS AND METHODS FOR ADJUSTING A RELATIVE DISTANCE BETWEEN OF A HEEL SUPPORT PANEL AND A PEDAL OF A VEHICLE

(71) Applicant: GM GLOBAL TECHNOLOGY OPERATIONS LLC, Detroit, MI (US)

(72) Inventors: Bongbum Back, Incheon (KR); Seokju Yong, Gyeonggi (KR); Taekyung Kim, Seongnam-si (KR); Chul Yoo, Seoul (KR); James A Webster, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 363 days.

(21) Appl. No.: 18/534,324

(22) Filed: Dec. 8, 2023

(65) Prior Publication Data

US 2025/0187517 A1 Jun. 12, 2025

(51) Int. Cl.
*B60N 3/06* (2006.01)

(52) U.S. Cl.
CPC ..................................... *B60N 3/063* (2013.01)

(58) Field of Classification Search
CPC . B60N 3/063; B60N 2/06; B60N 2/90; B60N 3/06; B60R 2021/0046
USPC ........ 296/75; 297/340, 344.1, 423.19, 463.1, 297/463.2
See application file for complete search history.

(56) References Cited

U.S. PATENT DOCUMENTS

| | | | | |
|---|---|---|---|---|
| 6,474,728 B1 * | 11/2002 | Mendis | .................. | B60K 23/00 296/65.01 |
| 7,437,229 B2 * | 10/2008 | Ohtsubo | ................ | B60N 3/063 701/49 |
| 7,712,816 B2 * | 5/2010 | Ujimoto | ................. | B62D 25/20 180/326 |
| 2009/0088930 A1 * | 4/2009 | Ohtsubo | .............. | B60N 2/0252 297/316 |

FOREIGN PATENT DOCUMENTS

| | | | | |
|---|---|---|---|---|
| FR | 2689081 A1 * | 10/1993 | ............. | B60N 3/063 |
| FR | 2737459 A1 | 2/1997 | | |

OTHER PUBLICATIONS

English translation of FR2689081A1; https://translationportal.epo.org; Feb. 4, 2026 (Year: 2026).*

* cited by examiner

*Primary Examiner* — Roger L Pang
(74) *Attorney, Agent, or Firm* — Ingrassia Fisher & Lorenz, LLP I IF&L

(57) ABSTRACT

Systems and methods are provided for a vehicle. The systems include a heel support panel configured to support a foot of a driver while the driver is interacting with a pedal of the vehicle. The heel support panel is functionally coupled to a seat adjustment system configured to move a seat of the vehicle in a forward direction towards the front of the vehicle and a rearward direction toward the rear of the vehicle. The heel support panel moves in an upward direction away from a floor panel of the vehicle and thereby reduces a dimension between the heel support panel and the pedal as the seat is moved in the forward direction, and moves in a downward direction toward the floor panel and thereby increases the dimension between the heel support panel and the pedal as the seat is moved in the rearward direction.

20 Claims, 9 Drawing Sheets

SYSTEMS AND METHODS FOR ADJUSTING A RELATIVE DISTANCE BETWEEN OF A HEEL SUPPORT PANEL AND A PEDAL OF A VEHICLE

INTRODUCTION

The technical field generally relates to vehicles, and more particularly relates to systems and methods for automatically adjusting a height of a floor below a foot pedal in a vehicle.

Commercially available vehicles typically include one or more foot operable pedals including, for example, an accelerator pedal, a brake pedal, and a clutch pedal (e.g., for manual shift vehicles). These pedals are commonly positioned at specific, fixed heights above a floor of the vehicle based on an average body size of drivers. However, pedals at these heights may be difficult for certain drivers to use. For example, drivers with heights and/or foot sizes that are well below average may have difficulty reaching the pedals while a heel of their foot is resting on the floor of the vehicle.

Accordingly, it is desirable to provide systems and method capable of adjusting a position of one or more foot pedals within a vehicle. Furthermore, other desirable features and characteristics of the present disclosure will become apparent from the subsequent detailed description and the appended claims, taken in conjunction with the accompanying drawings and the foregoing introduction.

SUMMARY

A system is provided for a vehicle. In one example, the system includes a heel box coupled to a floor panel of the vehicle. The heel box has a heel support panel configured to support a foot of a driver while the driver is interacting with a pedal of the vehicle with the foot. The heel box is functionally coupled to a seat adjustment system configured to move a seat of the vehicle in a forward direction towards the front of the vehicle and a rearward direction toward the rear of the vehicle. The heel support panel moves in an upward direction away from the floor panel and thereby reduces a first dimension between the heel support panel and the pedal as the seat is moved toward the front of the vehicle. The heel support panel moves in a downward direction toward the floor panel and thereby increases the first dimension between the heel support panel and the pedal as the seat is moved toward a rear of the vehicle.

In various examples, the system includes an elongated member functionally coupling the heel box to the seat adjustment system. The elongated member is configured to move relative to the heel box in response to the seat adjustment system moving the seat, and the movement of the elongated member relative to the heel box causes the heel support panel to move in the upward and downward directions away from and toward the floor panel, respectively, as the seat is moved toward the front and the rear of the vehicle, respectively.

In various examples, the system includes a guide for maintaining a lateral position of the elongated member relative to the heel box.

In various examples, the seat adjustment system includes tracks along which the seat is slidable to move the seat in the forward and rearward directions, wherein central longitudinal axes of the tracks and the elongated member are disposed in different geometric planes that are not parallel, wherein the system includes linkage coupling the seat adjustment system and the elongated member that is configured to accommodate for the difference in the geometric planes as the seat and the elongated member move.

In various examples, the elongated member and the heel box are configured for physical contact therebetween but are not physically coupled.

In various examples, the system includes a biasing member configured to bias the heel support panel to move in the downward direction toward the floor panel.

In various examples, the system includes a wedge disposed between a base panel of the heel box and a sloped wall of the heel box. The wedge has a cross-sectional dimension between the base panel and the sloped wall that increases in a first direction from a first end of the heel box to a second end of the heel box opposite the first end. The sloped wall angled such that a second dimension between the sloped wall and the base panel increases in the first direction from the first end of the heel box to the second end of the heel box. The elongated member is configured to push the wedge in a second direction toward the first end of the heel box as the seat moves toward the front of the vehicle. Movement of the wedge toward the first end of the heel box causes an upper wall of the wedge to push against the sloped wall and force the heel support panel in the upward direction away from the floor panel.

In various examples, the wedge includes rollers on the upper wall and an oppositely disposed lower wall to promote the movement of the wedge along the base panel and the sloped wall.

In various examples, the system includes a biasing member configured to bias the wedge to move in the downward direction toward the second end of the heel box.

In various examples, the system includes a flexible bladder within the heel box that is filled with a gas or liquid. The flexible bladder is compressed between a first end and a second end of the heel box when the seat is moved toward the front of the vehicle. Compression of the flexible bladder forces the heel support panel in the upward direction away from the floor panel.

In various examples, the system includes a piston member and a hydraulic fluid. The piston member applies a force against the hydraulic fluid when the seat moves toward the front of the vehicle and in response the hydraulic fluid forces the heel support panel in the upward direction away from the floor panel.

In various examples, the heel support panel is configured to move in response to movement of the seat for only a portion of a movement capability of the seat that is less than an entirety thereof.

A method is provided for is provided for a vehicle. In one example, the method includes moving a seat of the vehicle in a forward direction toward a front of the vehicle, automatically moving a heel support panel in an upward direction away from a floor panel of the vehicle in response to the seat moving toward the front of the vehicle and thereby reducing a first dimension between the heel support panel and a pedal of the vehicle, supporting a heel of a foot of a driver of the vehicle with the heel support panel while the driver is interacting with the pedal of the vehicle with the foot, moving the seat in a rearward direction toward a rear of the vehicle, and automatically moving the heel support panel in a downward direction toward the floor panel in response to the seat moving toward the rear of the vehicle and thereby increasing the first dimension between the heel support panel and the pedal.

In various examples, the method includes moving an elongated member in response to the seat moving in the forward direction toward the front of the vehicle and thereby cause the heel support panel to move in the upward direction away from the floor panel, and moving the elongated member in response to the seat moving in the rearward direction toward the rear of the vehicle and thereby cause the heel support panel to move in the downward direction toward the floor panel.

In various examples, the method includes pushing a wedge of a heel box in a first direction with the elongated member in response to the seat moving in the forward direction toward the front of the vehicle. The wedge is disposed between a base panel of the heel box and a sloped wall of the heel box. The sloped wall is coupled to the heel support panel. The wedge having a cross-sectional dimension between the base panel and the sloped wall that increases in a second direction from a first end of the heel box to a second end of the heel box opposite the first end. The sloped wall angled such that a second dimension between the sloped wall and the base panel increases in the second direction from the first end of the heel box to the second end of the heel box. Movement of the wedge in the first direction toward the first end of the heel box causes an upper wall of the wedge to push against the sloped wall and force the heel support panel in the upward direction away from the base panel.

In various examples, the method includes rolling the wedge along the base panel and the sloped wall on rollers disposed on the upper wall and an oppositely disposed lower wall of the wedge as the elongated member pushes the wedge in the first direction.

In various examples, the method includes biasing the heel support panel to move in the downward direction toward the floor panel, and biasing the wedge to move in the second direction toward the second end of the heel box.

In various examples, wherein automatically moving the heel support panel in the upward direction away from the floor panel of the vehicle in response to the seat moving in the forward direction toward the front of the vehicle includes compressing a flexible bladder that is filled with a gas or liquid. Compression of the flexible bladder forces the heel support panel in the upward direction away from the floor panel.

In various examples, the method includes wherein automatically moving the heel support panel in the upward direction away from the floor panel of the vehicle in response to the seat moving in the forward direction toward the front of the vehicle includes applying a force against a hydraulic fluid with a piston member. Applying the force against the hydraulic fluid forces the heel support panel in the upward direction away from the floor panel.

A vehicle is provided that, in one example, includes a seat, a seat adjustment system configured to move the seat in a forward direction towards the front of the vehicle and a rearward direction towards the rear of the vehicle, and a heel box coupled to a floor panel of the vehicle and functionally coupled to the seat adjustment system. The heel box has a heel support panel configured to support a foot of a driver while the driver is interacting with a pedal of the vehicle with the foot. The heel support panel moves in a upward direction away from the floor panel and thereby reduces a first dimension between the heel support panel and the pedal as the seat is moved in the forward direction toward the front of the vehicle. The heel support panel moves in a downward direction toward the floor panel and thereby increases the first dimension between the heel support panel and the pedal as the seat is moved in the rearward direction toward a rear of the vehicle.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description.

Figure 1:
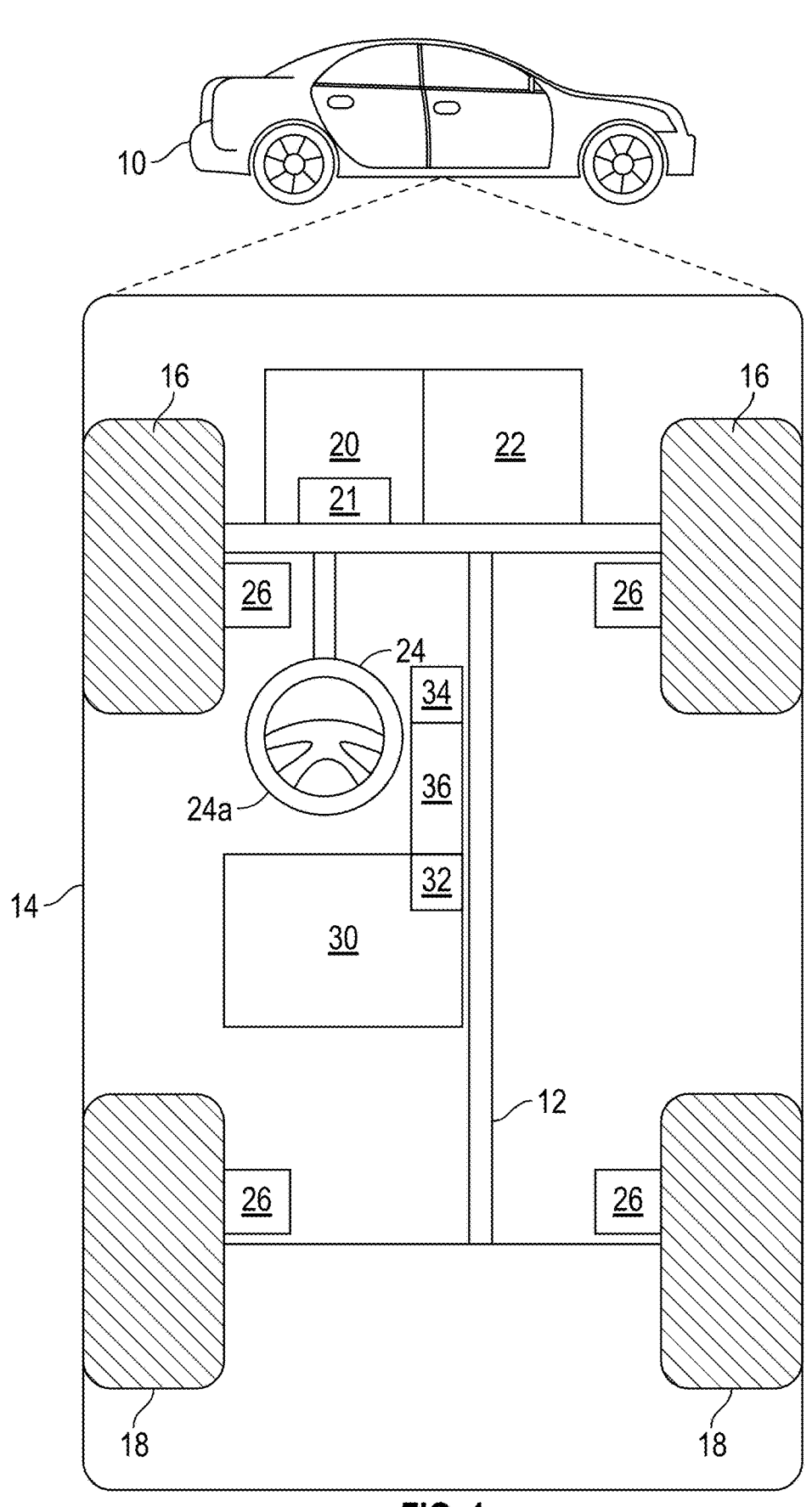
FIG. 1 is a functional block diagram of a vehicle that includes a pedal adjustment system in accordance with an example.

FIG. 1 illustrates a vehicle 10, according to an example. In certain examples, the vehicle 10 comprises an automobile. The vehicle 10 includes a pedal adjustment system 36 having components for adjusting a vertical dimension between a floor panel of the vehicle 10 and one or more foot operable pedals 34 of the vehicle 10.

In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

The vehicle 10 further includes a propulsion system 20, a transmission system 22, a steering system 24, a braking system comprising brakes 26, a seat 30, a seat adjustment system comprising a motor 32 for adjusting a position of the seat 30 between a front and a rear of the vehicle 10, one or more foot operable pedals 34 for performing certain driving tasks, and the pedal adjustment system 36.

The propulsion system 20 includes an engine and/or motor 21 such as an internal combustion engine (e.g., a gasoline or diesel fueled combustion engine), an electric motor (e.g., a 3-phase AC motor), or a hybrid system that includes more than one type of engine and/or motor. The transmission system 22 is configured to transmit power from the propulsion system 20 to the wheels 16-18 according to selectable speed ratios. According to various examples, the transmission system 22 may include a step-ratio automatic transmission, a continuously-variable transmission, or other appropriate transmission. The steering system 24 influences a position of the wheels 16-18. While depicted as including a steering wheel 24a for illustrative purposes, in some examples contemplated within the scope of the present disclosure, the steering system 24 may not include a steering wheel. The braking system is operable to apply one or more of the brakes 26 to apply a braking torque to the wheels 16-18 and thereby reduce a speed of the vehicle 10. In some examples, the pedals 34 include an accelerator pedal 34a for using the propulsion system 20 to increase or maintain a speed of the vehicle 10, a brake pedal 34b for using the braking system to reduce the speed of the vehicle 10, and a clutch pedal 34c to use the transmission system 22 to, for example, change the selectable speed ratios.

Figure 2:
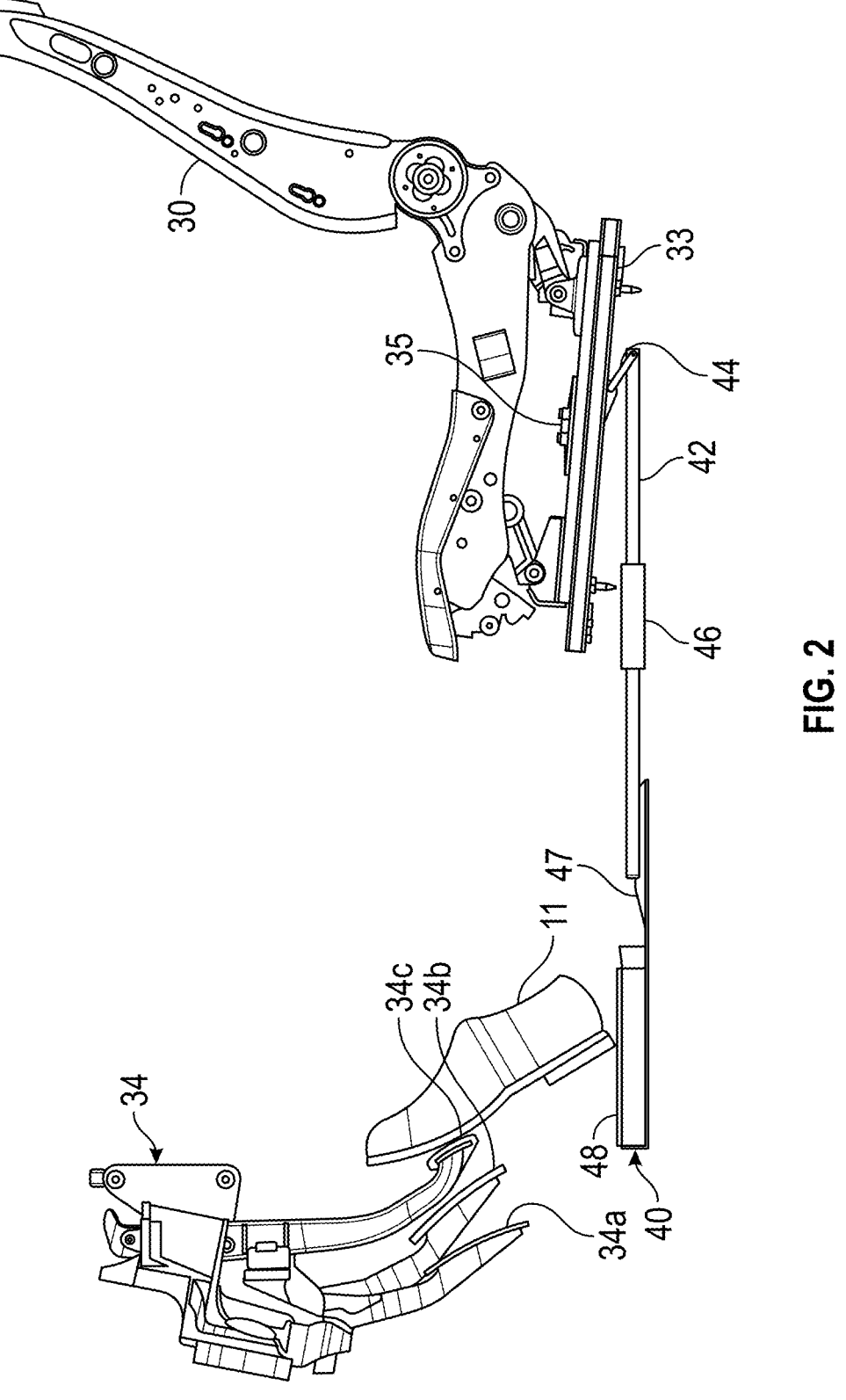
FIG. 2 is a side view of an exemplary pedal adjustment system in accordance with an example.
Figure 3:
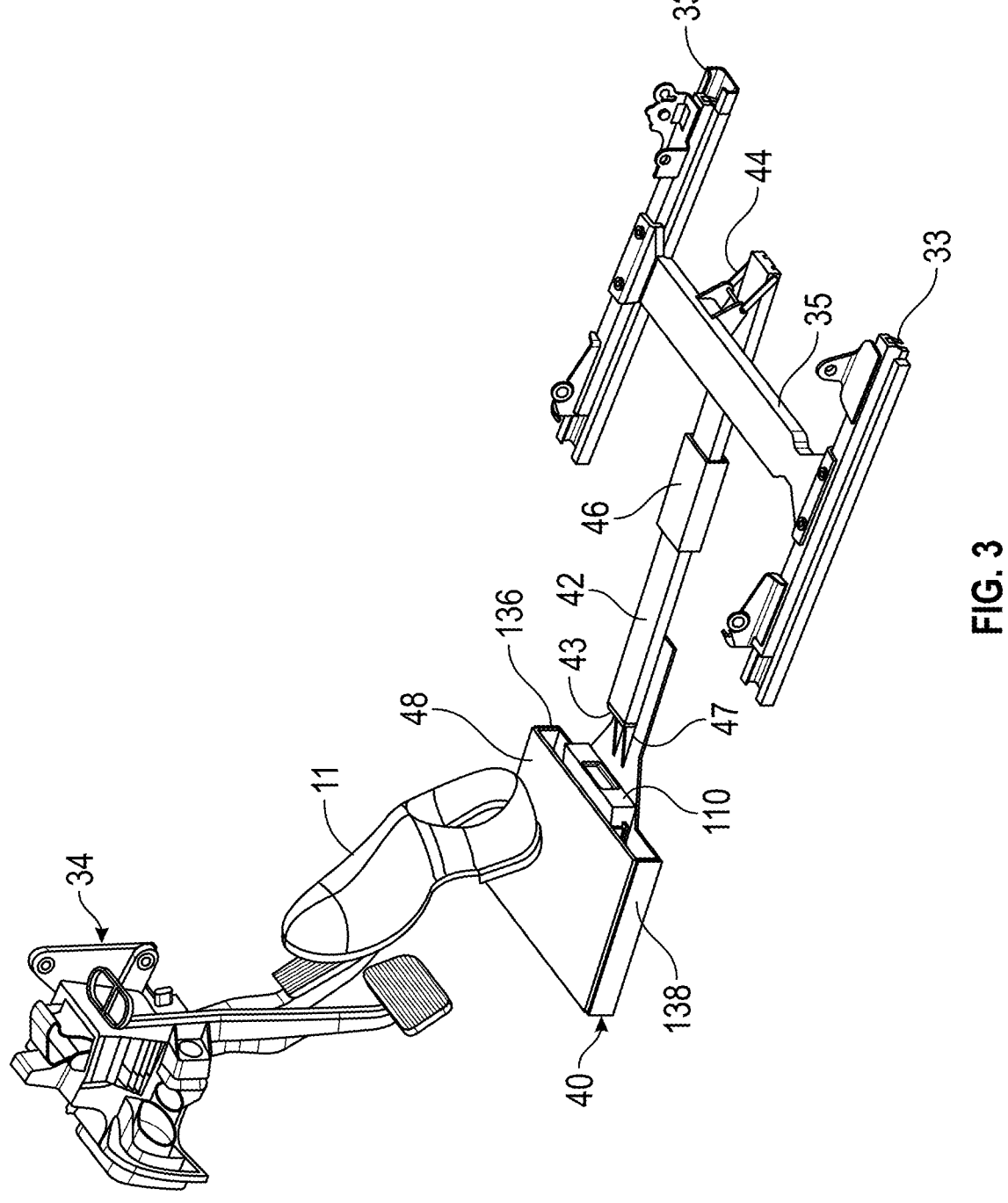
FIGS. 3 and 4 are perspective views of an exemplary pedal adjustment system in accordance with an example.
Figure 4:
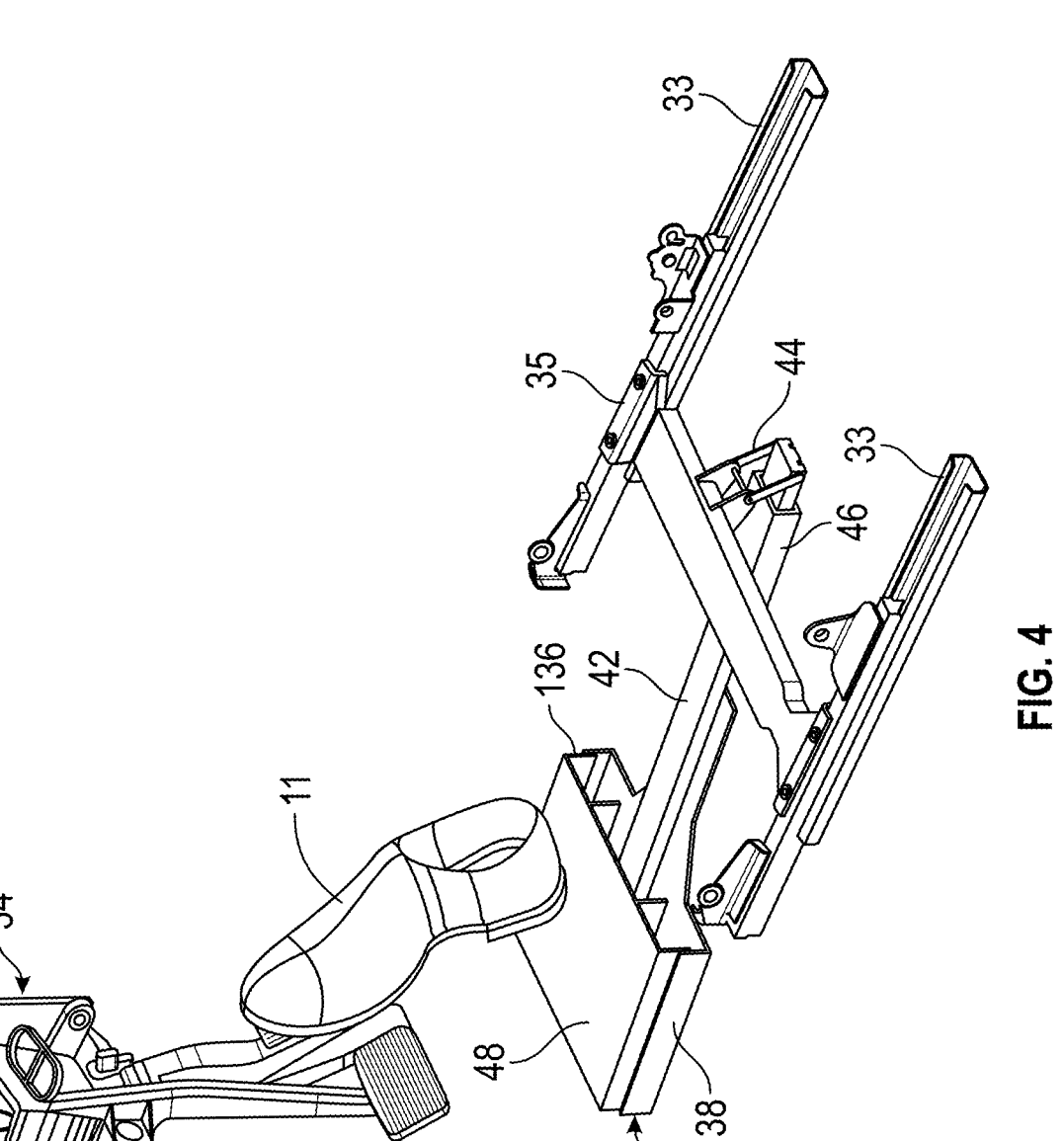
Figures 5, 6:
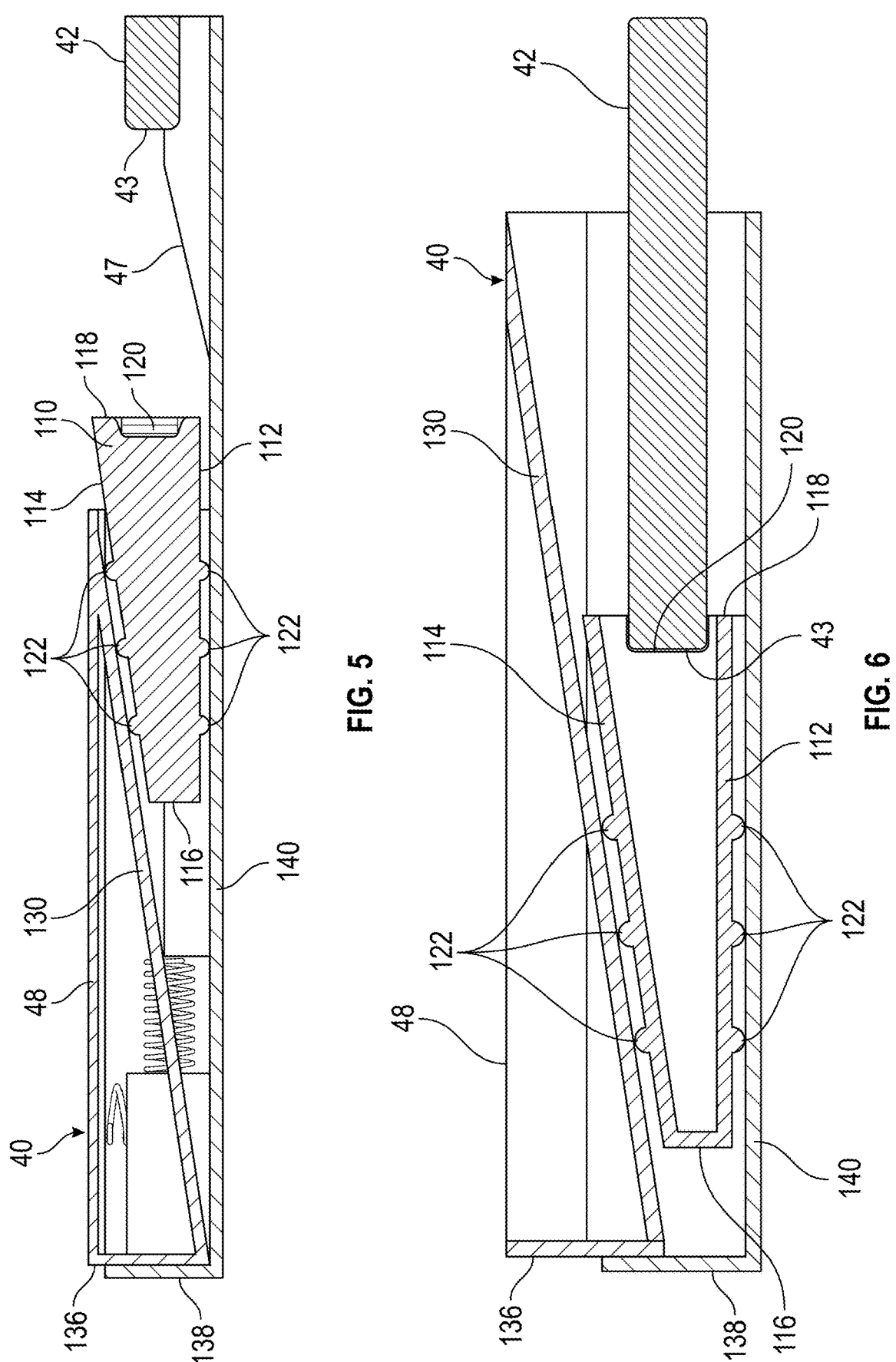
FIGS. 5 and 6 are cross-sectional views of a heel box of the pedal adjustment system of FIGS. 3 and 4 in accordance with an example.
Figure 7:
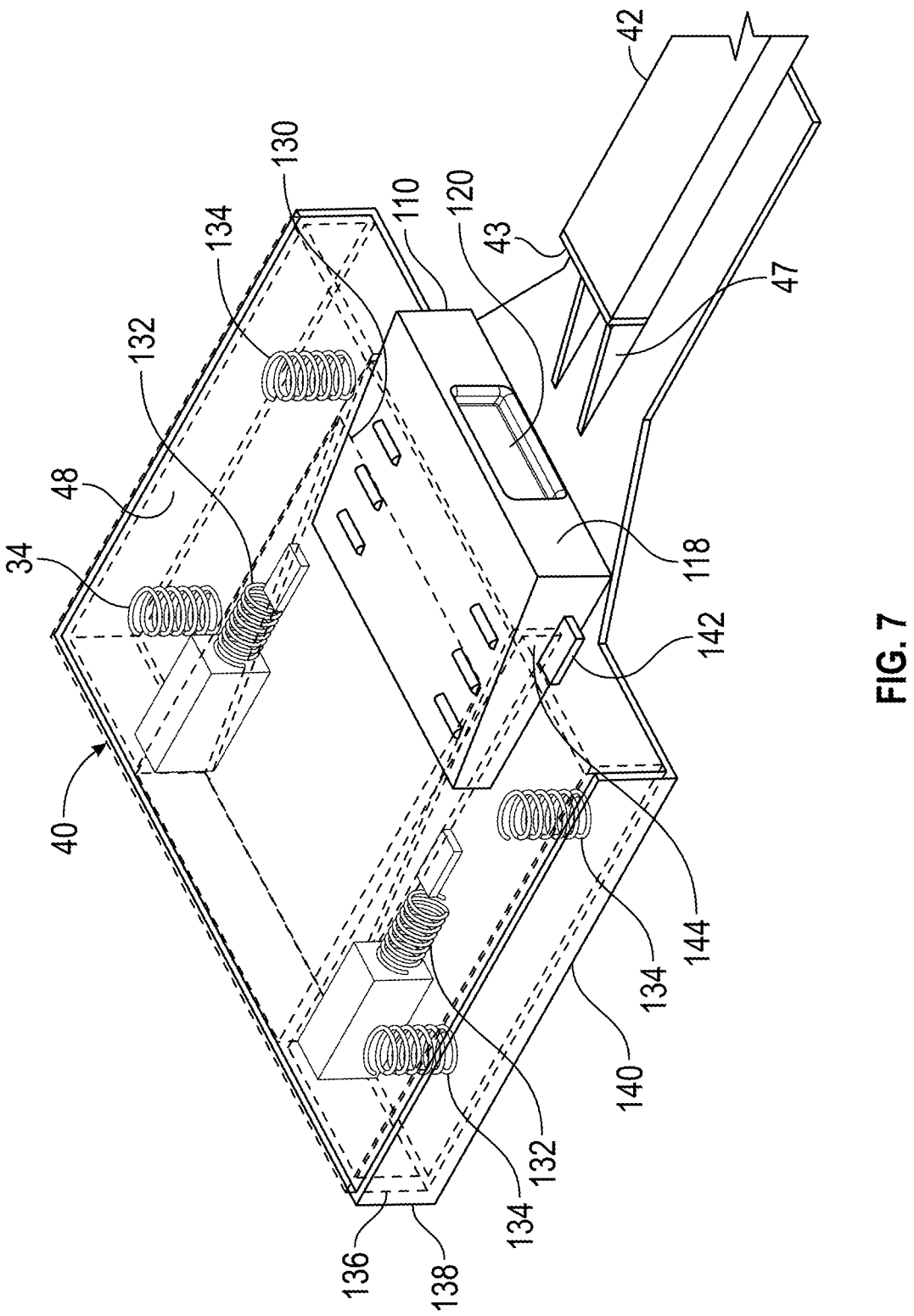
FIGS. 7 and 8 are perspective, see-through views of the heel box of FIGS. 5 and 6 in accordance with an example.
Figure 8:
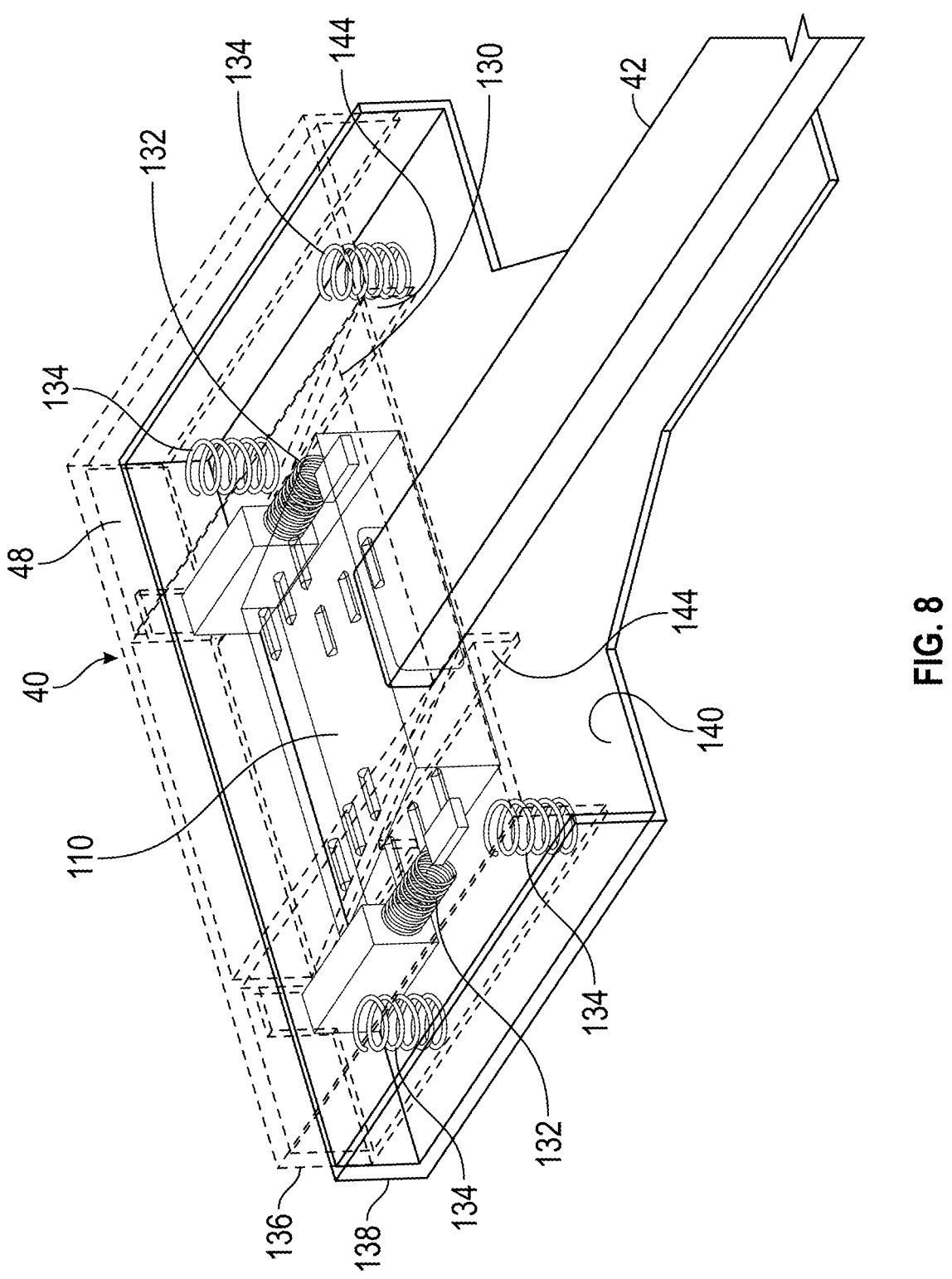

FIG. 2 illustrates various aspects of a nonlimiting example of the pedal adjustment system 36. In general, the pedal adjustment system 36 includes a heel box 40 and an elongated member 42 that, in combination, are configured to modify a position of a driver's foot 11 relative to the pedals 34 based on a position of the seat 30. The heel box 40 is coupled to a floor panel of the vehicle 10. The heel box 40 includes a heel support panel 48 configured to support a heel of the driver's foot 11 while the driver is interacting with one of the pedals 34. The elongated member 42 is functionally coupled to the seat adjustment system. As the seat adjustment system moves the seat 30 in directions between the front and rear of the vehicle 10 (i.e., forward and rearward directions), the elongated member 42 moves therewith and a distal end of the elongated member 42 moves relative to the heel box 40. In some examples, the distal end of the elongated member 42 moves into and out of the heel box 40 as the seat 30 is moved in the forward and rearward directions.

In general, movement of the distal end of the elongated member 42 causes the heel support panel 48 to move in an upward direction away from the floor panel and reduce a dimension between the heel support panel 38 and the pedals 34 as the seat 30 is moved in the forward direction toward the front of the vehicle 10 and causes the heel support panel 48 to move in a downward direction toward the floor panel and increase a dimension between the heel support panel 48 and the pedals 34 as the seat 30 is moved in the rearward direction toward the rear of the vehicle 10.

In this example, the seat adjustment system includes a pair of parallel seat tracks or rails 33 fixed to the floor panel and extending in directions between the front and the rear of the vehicle 10. A seat support frame 35 extends between the rails 33 and is configured to travel along the rails 33 to position the seat 30, that is, the seat support frame 35 is slidable on the rails 33 to move the seat 30 in the forward and rearward directions. The seat support frame 35 may be configured to be manually moved along the rails 33 or propelled with the motor 32 (see FIG. 1). In some examples, the motor 32 is configured to be operated by the driver interacting with a mechanism or control, or automatically operated by a controller having one or more processors.

In some examples, central longitudinal axes of the rails 33 and the elongated member 42 may be disposed in different geometric planes that are not parallel. As such, the elongated member 42 may be coupled to the seat support frame 35 by linkage 44 that is configured to provide for simultaneous movement of the seat 30 and the elongated member 42 while accommodating for the differences in the geometric planes of the rails 33 and the elongated member 42 and therefore accommodate for the difference in the travel paths of the seat 30 and the elongated member 42. One or more guides may be provided to maintain a desired travel path for the elongated member 42, that is, maintain a lateral position of the elongated member 42 relative to the heel box 40. In this example, the pedal adjustment system 36 includes a first guide 46 and a second guide 47.

The heel box 40 may include various structures and components configured to raise and lower the heel support panel 38 based on movement of the elongated member 42. In some examples, the heel box 40 and the elongated member 42 are configured for contact therebetween but are not physically coupled. FIGS. 3-8 illustrate various aspects of a first example of the heel box 40 that includes a wedge 110 configured to raise and lower the heel support panel 38. The wedge 110 includes a lower wall 112 configured to face the floor panel, an upper wall 114, a forward end 116, and a rear end 118. The rear end 118 includes a recess 120 defined by interior walls of the wedge 110. The recess 120 is configured to receive the distal end 43 of the elongated member 42. The upper wall 114 of the wedge 110 is angled relative to the lower wall 112 to define a cross-sectional dimension (e.g., height) between the upper wall 114 and the lower wall 112 that increases in a direction from the forward end 116 toward the rear end 118. The wedge 110 may include one or more rollers 122 disposed on the upper wall 114 and the lower wall 112 configured to promote ease of movement of the wedge 110 within the heel box 40.

The heel box 40 may include a lower portion 138 fixed to the floor panel of the vehicle 10 and an upper portion 136 slidably coupled thereto. The heel support panel 48 may define an uppermost surface of the upper portion 136. The wedge 110 is disposed between a base panel 140 of the lower portion 138 and a sloped wall 130 of the upper portion 136. The sloped wall 130 may be angled such that a dimension between the sloped wall 130 and the base panel 140 increases in a direction from the front end of the heel box 40 to a rear end of the heel box 40. When contacted by the distal end 43 of the elongated member 42, the wedge 110 may be forced in a direction toward the front end of the heel box 40. The rollers 122 on the lower wall 112 of the wedge 110 roll along the base panel 140 and the rollers 122 on the upper wall 114 of the wedge 110 roll along the sloped wall 130. As the wedge 110 moves further toward the front end of the heel box 40, the rollers 122 on the upper wall 114 of the wedge 110 push against the sloped wall 130 and force the upper portion 136 of the heel box 40 upwards, that is, away from the lower portion 138 thereby raising the heel support panel 48.

When the elongated member 42 is pulled back toward a rear of the vehicle 10 and is no longer applying a force on the wedge 110, the wedge 110 may be pushed toward the rear end of the heel box 40 by wedge biasing elements 132. In some examples, the wedge biasing elements 132 may be coupled to tabs 142 extending from sides of the wedge 110. As the wedge 110 moves towards the rear end of the heel box 40, the upper portion 136 may be pulled toward the lower portion 138 with heel box biasing elements 134. In some examples, the heel box 40 may include wedge guide walls 144 for maintaining the wedge 110 along a predetermined path within the heel box 40.

In various examples, the heel support panel 48 is configured to move in response to movement of the seat 30 for only a portion of a movement capability of the seat 30 that is less than an entirety thereof. For example, the rails 33 may have a length of about 30 centimeters (cm) which thereby defines the movement capability of the seat 30. In such example, the heel support panel 48 may move in response to the seat 30 moving along, for example, the forwardmost ten (10) cm of the rails 33 and not move in response to the seat 30 moving in the remaining twenty (20) cm of the rails 33. In some examples, this may be accomplished by configuring the elongated member 42 to contact the heel box 40 only in the forwardmost 10 cm of the rails 33. That is, a 20 cm space may be provided between the heel box 40 and the elongated member 42 when the seat 30 in disposed in a rearmost position, and upon moving the seat 30 forward, the elongated member 42 contacts the heel box 40 after traveling 20 cm, and functions to move the heel support panel 48 as the seat 30 moves forward for the remaining 10 cm of travel.

Figures 9, 10:
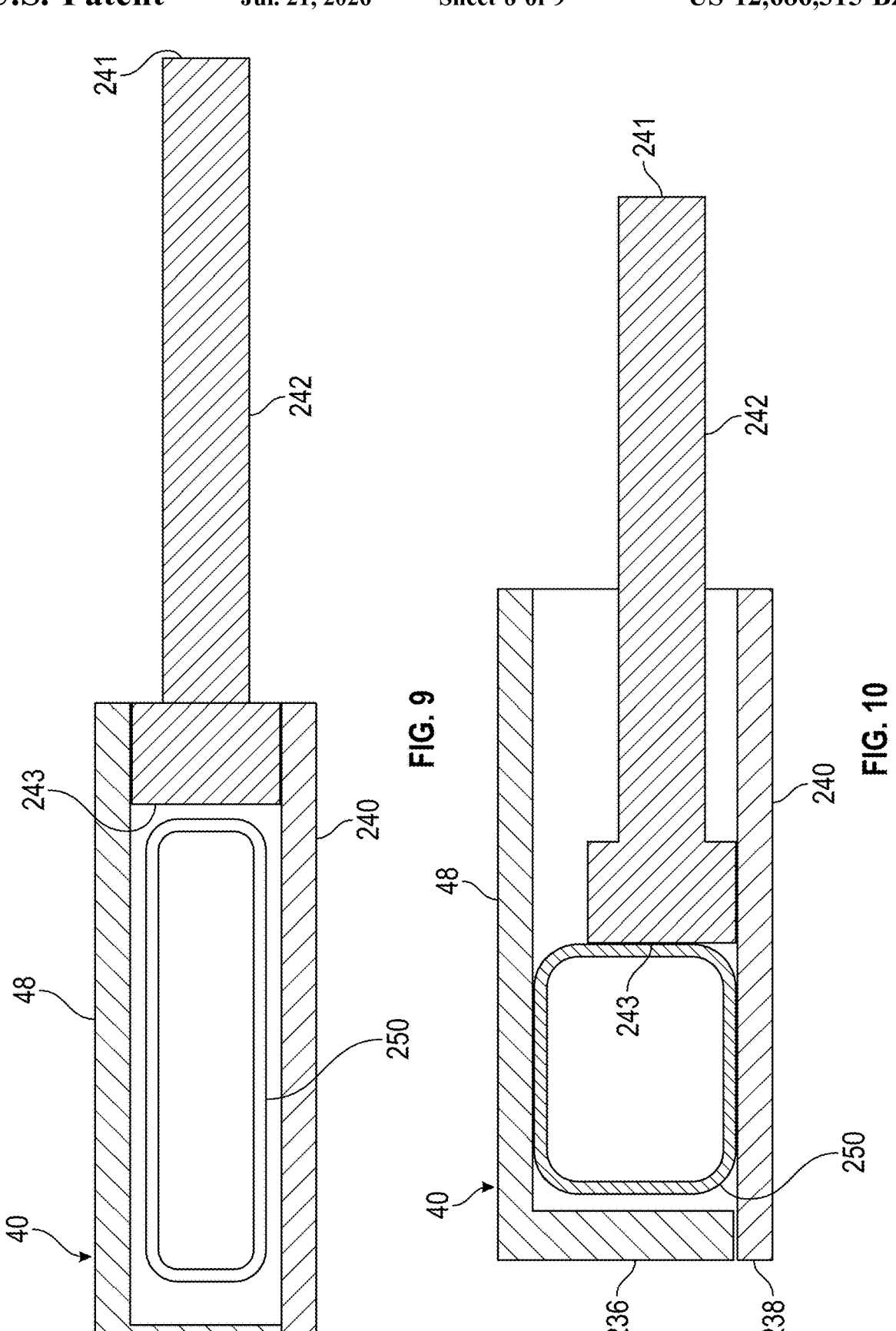
FIGS. 9 and 10 are cross-sectional views of a heel box of a pedal adjustment system for a vehicle in accordance with an example.

FIGS. 9 and 10 illustrate various aspects of a second example of the heel box 40 that includes a piston member 242 configured to raise and lower the heel support panel 38. Various aspects of the second example may be similar or the same as the first example of FIGS. 3-8. For example, the heel box 40 may include a lower portion 238 fixed to the floor panel of the vehicle 10 and an upper portion 236 slidably coupled thereto. The heel support panel 48 may define an uppermost surface of the upper portion 236. A forward end 243 of the piston member 242 is disposed between a base panel 240 of the lower portion 238 and the heel support panel 38 of the upper portion 136.

The piston member 242 may include a rearward end 241 may be configured to be contacted by or coupled with the distal end 43 of the elongated member 42. When contacted by the distal end 43 of the elongated member 42, the piston member 242 may be forced in a direction toward the front end of the heel box 40. As the piston member 242 moves further toward the front end of the heel box 40, the forward end 243 compresses and/or applies a force to an element 250 between the forward end 243 and interior walls of the heel box 40. This causes the element 250 to apply a force on the upper portion 136 of the heel box 40 directed upwards, that is, away from the lower portion 138, thereby raising the heel support panel 48. The element 250 may have various structures. In some examples, the element 250 may include a flexible bladder filled with a gas or a liquid. In some examples, the element 250 may be a hydraulic fluid or other substantially incompressible fluid.

When the elongated member 42 is pulled back toward a rear of the vehicle 10 and no longer applying a force on the piston member 242, the piston member 242 may be pushed toward the rear end of the heel box 40 by the element 250 and the upper portion 236 may be pulled downward toward the lower portion 138 by the element 250. Alternatively, the piston member 242 may be pushed toward the rear end of the heel box 40 and the upper portion 236 may be pulled downward toward the lower portion 138 by one or more biasing elements.

Figure 11:
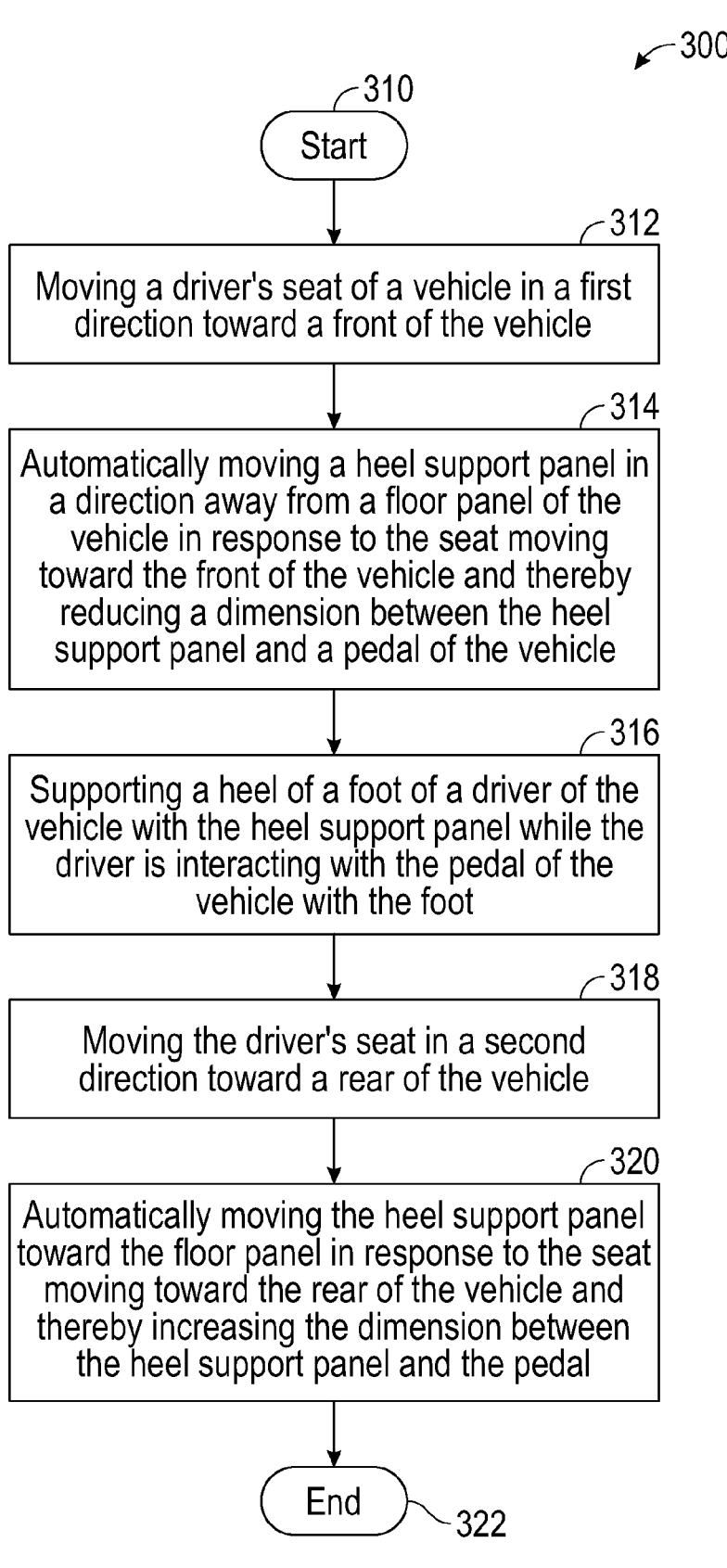
FIG. 11 is a flowchart illustrating a method for adjusting a relative position of a heel support panel and a pedal of a vehicle in accordance with an example.

With reference now to FIG. 11 and with continued reference to FIGS. 1-10, a flowchart provides a method 300 for adjusting a relative position of a heel support panel and a pedal of a vehicle as performed by the pedal adjustment system 36, in accordance with various examples. As can be appreciated in light of the disclosure, the order of operation within the method 300 is not limited to the sequential execution as illustrated in FIG. 11, but may be performed in one or more varying orders as applicable and in accordance with the present disclosure.

In one example, the method 300 may start at 310. At 312, the method 300 may include moving a driver's seat (e.g., the seat 30) of a vehicle (e.g., the vehicle 10) in a first direction toward a front of the vehicle. At 314, the method 300 may include automatically moving a heel support panel (e.g., the heel support panel 48) in a direction away from a floor panel of the vehicle in response to the seat moving toward the front of the vehicle and thereby reducing a dimension between the heel support panel and a pedal (e.g., the pedal(s) 34) of the vehicle. At 316, the method 300 may include supporting a heel of a foot of a driver of the vehicle with the heel support panel while the driver is interacting with the pedal of the vehicle with the foot. At 318, the method 300 may include moving the driver's seat in a second direction toward a rear of the vehicle. At 320, the method 300 may include automatically moving the heel support panel toward the floor panel in response to the seat moving toward the rear of the vehicle and thereby increasing the dimension between the heel support panel and the pedal. The method 300 may end at 322.

The systems and methods disclosed herein provide various benefits over certain existing systems and methods. For example, by adjusting a position of the heel support panel 48 in response to changes in the position of the front seat 30, the position of the driver's foot relative to the pedal(s) 34 may be automatically adjusted. In this manner, certain drivers, such as those with heights and/or foot sizes that are below average, may be able to more easily operate the pedal(s) 34.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for a vehicle, the system comprising:
   a heel box coupled to a floor panel of the vehicle, the heel box having a heel support panel configured to support a foot of a driver while the driver is interacting with a pedal of the vehicle with the foot, wherein the heel box is functionally coupled to a seat adjustment system configured to move a seat of the vehicle in a forward direction towards the front of the vehicle and a rearward direction toward the rear of the vehicle, wherein the heel support panel moves in an upward direction away from the floor panel and thereby reduces a first dimension between the heel support panel and the pedal as the seat is moved toward the front of the vehicle and the heel support panel moves in a downward direction toward the floor panel and thereby increases the first dimension between the heel support panel and the pedal as the seat is moved toward a rear of the vehicle; and
   an elongated member functionally coupling the heel box to the seat adjustment system, wherein the elongated member is configured to move relative to the heel box in response to the seat adjustment system moving the seat, wherein movement of the elongated member relative to the heel box causes the heel support panel to move in the upward and downward directions away from and toward the floor panel, respectively, as the seat is moved toward the front and the rear of the vehicle, respectively.

2. The system of claim 1, further comprising a guide for maintaining a lateral position of the elongated member relative to the heel box.

3. The system of claim 1, wherein the seat adjustment system includes tracks along which the seat is slidable to move the seat in the forward and rearward directions, wherein central longitudinal axes of the tracks and the elongated member are disposed in different geometric planes that are not parallel, wherein the system includes linkage coupling the seat adjustment system and the elongated member that is configured to accommodate for the difference in the geometric planes as the seat and the elongated member move.

4. The system of claim 1, wherein the elongated member and the heel box are configured for physical contact therebetween but are not physically coupled.

5. The system of claim 1, further comprising a biasing member configured to bias the heel support panel to move in the downward direction toward the floor panel.

6. The system of claim 1, further comprising a wedge disposed between a base panel of the heel box and a sloped wall of the heel box, the wedge having a cross-sectional dimension between the base panel and the sloped wall that increases in a first direction from a first end of the heel box to a second end of the heel box opposite the first end, the sloped wall angled such that a second dimension between the sloped wall and the base panel increases in the first direction from the first end of the heel box to the second end of the heel box, wherein the elongated member is configured to push the wedge in a second direction toward the first end of the heel box as the seat moves toward the front of the vehicle, wherein movement of the wedge toward the first end of the heel box causes an upper wall of the wedge to push against the sloped wall and force the heel support panel in the upward direction away from the floor panel.

7. The system of claim 6, wherein the wedge includes rollers on the upper wall and an oppositely disposed lower wall to promote the movement of the wedge along the base panel and the sloped wall.

8. The system of claim 6, further comprising a biasing member configured to bias the wedge to move in the downward direction toward the second end of the heel box.

9. The system of claim 1, further comprising a flexible bladder within the heel box that is filled with a gas or liquid, wherein the flexible bladder is compressed between a first end and a second end of the heel box when the seat is moved toward the front of the vehicle, wherein compression of the flexible bladder forces the heel support panel in the upward direction away from the floor panel.

10. The system of claim 1, further comprising a piston member and a hydraulic fluid, wherein the piston member applies a force against the hydraulic fluid when the seat moves toward the front of the vehicle and in response the hydraulic fluid forces the heel support panel in the upward direction away from the floor panel.

11. The system of claim 1, wherein the heel support panel is configured to move in response to movement of the seat for only a portion of a movement capability of the seat that is less than an entirety thereof.

12. A method for a vehicle, comprising:

moving a seat of the vehicle in a forward direction toward a front of the vehicle;

moving an elongated member relative to a heel support panel in response to the seat moving in the forward direction toward the front of the vehicle;

automatically moving the heel support panel in an upward direction away from a floor panel of the vehicle in response to the elongated member moving relative thereto as the seat is moving toward the front of the vehicle and thereby reducing a first dimension between the heel support panel and a pedal of the vehicle;

supporting the heel of a foot of a driver of the vehicle with the heel support panel while the driver is interacting with the pedal of the vehicle with the foot;

moving the seat in a rearward direction toward a rear of the vehicle;

moving the elongated member relative to the heel support panel in response to the seat moving in the rearward direction toward the rear of the vehicle; and automatically moving the heel support panel in a downward direction toward the floor panel in response to the elongated member moving relative thereto as the seat is moving toward the rear of the vehicle and thereby increasing the first dimension between the heel support panel and the pedal.

13. The method of claim 12, further comprising pushing a wedge of a heel box in a first direction with the elongated member in response to the seat moving in the forward direction toward the front of the vehicle, wherein the wedge is disposed between a base panel of the heel box and a sloped wall of the heel box, wherein the sloped wall is coupled to the heel support panel, the wedge having a cross-sectional dimension between the base panel and the sloped wall that increases in a second direction from a first end of the heel box to a second end of the heel box opposite the first end, the sloped wall angled such that a second dimension between the sloped wall and the base panel increases in the second direction from the first end of the heel box to the second end of the heel box, wherein movement of the wedge in the first direction toward the first end of the heel box causes an upper wall of the wedge to push against the sloped wall and force the heel support panel in the upward direction away from the base panel.

14. The method of claim 13, further comprising rolling the wedge along the base panel and the sloped wall on rollers disposed on the upper wall and an oppositely disposed lower wall of the wedge as the elongated member pushes the wedge in the first direction.

15. The method of claim 13, further comprising:

biasing the heel support panel to move in the downward direction toward the floor panel; and biasing the wedge to move in the second direction toward the second end of the heel box.

16. The method of claim 12, wherein automatically moving the heel support panel in the upward direction away from the floor panel of the vehicle in response to the seat moving in the forward direction toward the front of the vehicle includes compressing a flexible bladder that is filled with a gas or liquid, wherein compression of the flexible bladder forces the heel support panel in the upward direction away from the floor panel.

17. The method of claim 12, wherein automatically moving the heel support panel in the upward direction away from the floor panel of the vehicle in response to the seat moving in the forward direction toward the front of the vehicle includes applying a force against a hydraulic fluid with a piston member, wherein applying the force against the hydraulic fluid forces the heel support panel in the upward direction away from the floor panel.

18. A vehicle, comprising:

a seat;

a seat adjustment system configured to move the seat in a forward direction towards the front of the vehicle and a rearward direction towards the rear of the vehicle;

a heel box coupled to a floor panel of the vehicle and functionally coupled to the seat adjustment system, the heel box having a heel support panel configured to support a foot of a driver while the driver is interacting with a pedal of the vehicle with the foot, wherein the heel support panel is configured to move in a upward direction away from the floor panel and thereby reduce a first dimension between the heel support panel and the pedal as the seat is moved in the forward direction toward the front of the vehicle and the heel support panel is configured to move in a downward direction toward the floor panel and thereby increase the first dimension between the heel support panel and the pedal as the seat is moved in the rearward direction toward a rear of the vehicle; and an elongated member functionally coupling the heel box to the seat adjustment system, wherein the elongated member is configured to move relative to the heel box in response to the seat adjustment system moving the seat, wherein movement of the elongated member relative to the heel box causes the heel support panel to move in the upward and downward directions away from and toward the floor panel, respectively, as the seat is moved toward the front and the rear of the vehicle, respectively.

19. The vehicle of claim 18, further comprising a wedge disposed between a base panel of the heel box and a sloped wall of the heel box, the wedge having a cross-sectional dimension between the base panel and the sloped wall that increases in a first direction from a first end of the heel box to a second end of the heel box opposite the first end, the sloped wall angled such that a second dimension between the sloped wall and the base panel increases in the first direction from the first end of the heel box to the second end of the heel box, wherein the elongated member is configured to push the wedge in a second direction toward the first end of the heel box as the seat moves toward the front of the vehicle, wherein movement of the wedge toward the first end of the heel box causes an upper wall of the wedge to push against the sloped wall and force the heel support panel in the upward direction away from the floor panel.

20. The vehicle of claim 18, further comprising a piston member and an element, wherein the piston member is functionally coupled with the elongated member, wherein the piston member applies a force against the element when the seat moves toward the front of the vehicle and in response the element forces the heel support panel in the upward direction away from the floor panel, wherein the element is a hydraulic fluid or a flexible bladder within the heel box that is filled with a gas or liquid.

* * * * *